(12) United States Patent
Kilic et al.

(10) Patent No.: US 10,457,505 B2
(45) Date of Patent: Oct. 29, 2019

(54) IMPROVEMENTS RELATING TO THE STACKING AND RECLAIMING OF BULK MATERIALS

(71) Applicant: Kilic Inventions Pty Ltd, Regency Park (AU)

(72) Inventors: Jason Kilic, Regency Park (AU); Ante Kilic, Regency Park (AU)

(73) Assignee: Kilic Inventions Pty Ltd, Regency Park (AU)

( * ) Notice: Subject to any disclaimer, the term of this patent is extended or adjusted under 35 U.S.C. 154(b) by 13 days.

(21) Appl. No.: 15/739,502

(22) PCT Filed: Jun. 24, 2016

(86) PCT No.: PCT/AU2016/000219
§ 371 (c)(1),
(2) Date: Dec. 22, 2017

(87) PCT Pub. No.: WO2016/205861
PCT Pub. Date: Dec. 29, 2016

(65) Prior Publication Data
US 2018/0186581 A1 Jul. 5, 2018

(30) Foreign Application Priority Data

Jun. 26, 2015 (AU) .................................. 2015902482
Feb. 25, 2016 (AU) .................................. 2016900675

(51) Int. Cl.
*B65G 65/28* (2006.01)
*B65G 65/36* (2006.01)
(Continued)

(52) U.S. Cl.
CPC ............. *B65G 65/36* (2013.01); *B65G 65/28* (2013.01); *B65G 65/32* (2013.01); *B65G 65/06* (2013.01)

(58) Field of Classification Search
CPC ................................ B65G 65/28; B65G 65/32
(Continued)

(56) References Cited

U.S. PATENT DOCUMENTS 3,586,152 A * 6/1971 Austin .................... B65G 65/28
198/508
3,604,757 A * 9/1971 White .................... B65G 65/28
406/165
(Continued)

OTHER PUBLICATIONS

International Search Report and Written Opinion dated Aug. 31, 2016, issued in corresponding Application No. PCT/AU2016/000219, filed Jun. 24, 2016, 13 pages.

*Primary Examiner* — Douglas A Hess
(74) *Attorney, Agent, or Firm* — Christensen O'Connor Johnson Kindness PLLC

(57) ABSTRACT

The present disclosure relates to equipment for handling bulk materials. In a particular form, the present disclosure relates to equipment for use in stockpiling grains in a bulk storage system of the type commonly referred to as a bunker, although its application is not so limited. In one aspect, there is provided a mobile stacker and reclaimer combination comprising a mobile stacker, and a mobile reclaimer which is movable independently to the mobile stacker, wherein in use, the mobile reclaimer simultaneously collects a bulk material and feeds this to the mobile stacker.

22 Claims, 7 Drawing Sheets

(51) Int. Cl.
*B65G 65/32* (2006.01)
*B65G 65/06* (2006.01)

(58) Field of Classification Search
USPC .... 198/311, 312, 313, 315, 316.1, 506, 518, 198/519
See application file for complete search history.

(56) References Cited

U.S. PATENT DOCUMENTS

| | | | | |
|---|---|---|---|---|
| 3,653,486 | A * | 4/1972 | McLean | B65G 65/20 |
| | | | | 198/508 |
| 4,244,463 | A * | 1/1981 | Bartley | B65G 65/06 |
| | | | | 198/508 |
| 4,629,060 | A * | 12/1986 | Schlegel | B65G 65/28 |
| | | | | 198/508 |
| 6,591,971 | B1 * | 7/2003 | Sheahan | A01F 25/2027 |
| | | | | 198/304 |
| 7,802,956 | B2 * | 9/2010 | Schertz | A01F 25/2027 |
| | | | | 414/296 |
| 7,938,251 | B2 * | 5/2011 | O'Connor | B65G 65/28 |
| | | | | 198/508 |
| 7,963,387 | B2 * | 6/2011 | Carmody | B65G 19/08 |
| | | | | 198/308.1 |
| 8,534,443 | B2 * | 9/2013 | Boyce | B65G 65/28 |
| | | | | 198/303 |
| 8,997,307 | B2 * | 4/2015 | Raiche | A01D 51/007 |
| | | | | 15/320 |
| 9,598,248 | B2 * | 3/2017 | Raiche | B65G 19/14 |
| 2009/0178898 | A1 | 7/2009 | Carmody et al. | |
| 2010/0314214 | A1 | 12/2010 | Boyce et al. | |

* cited by examiner

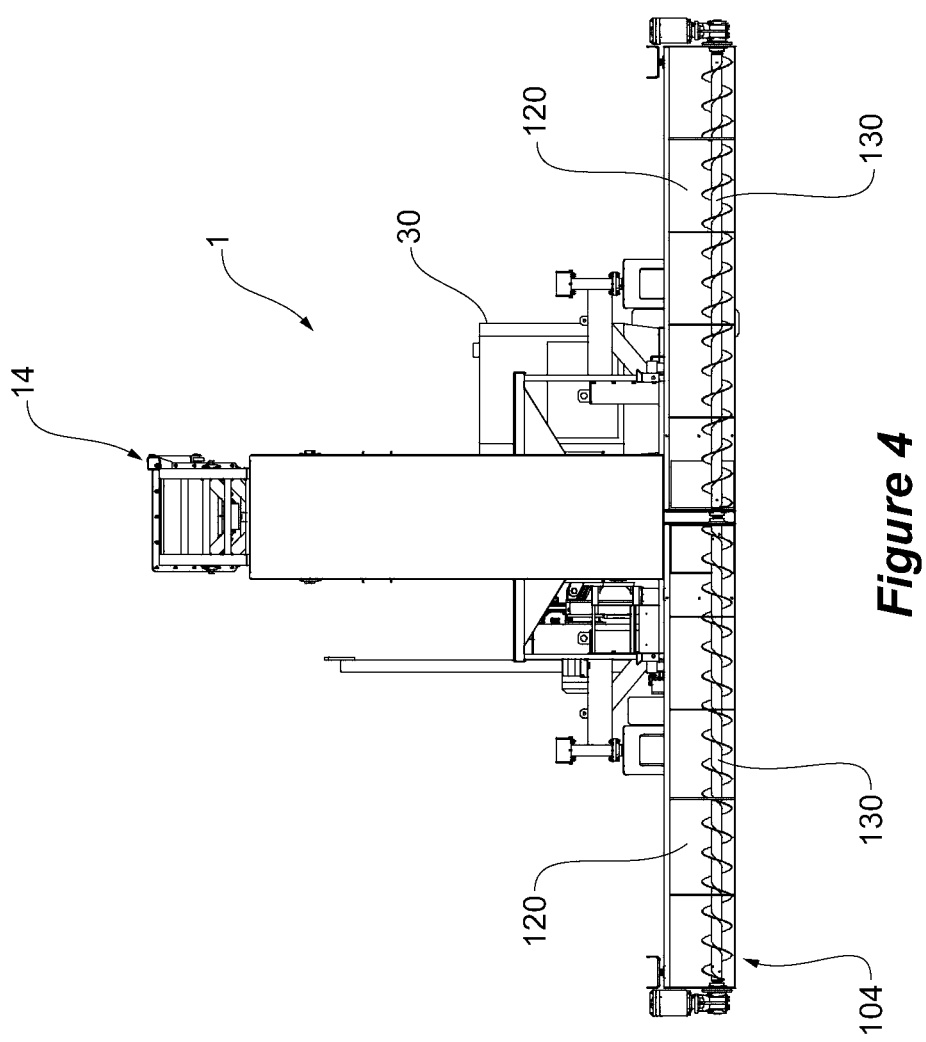

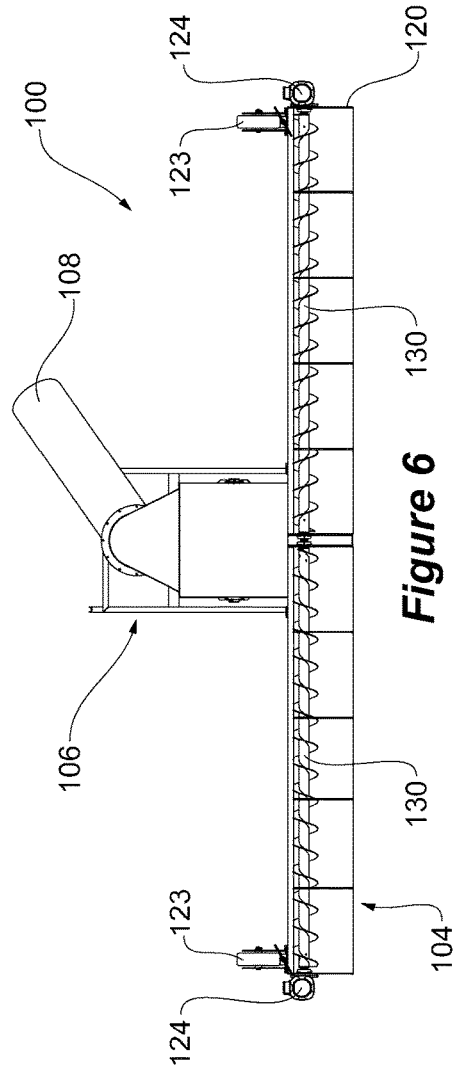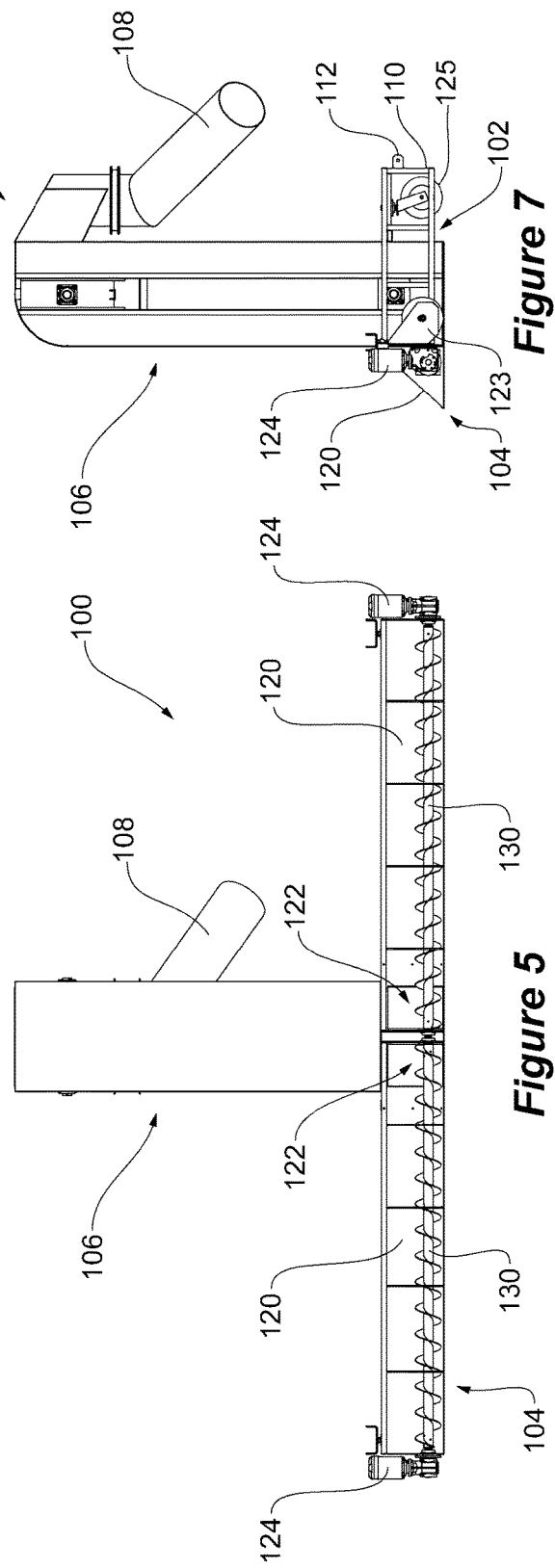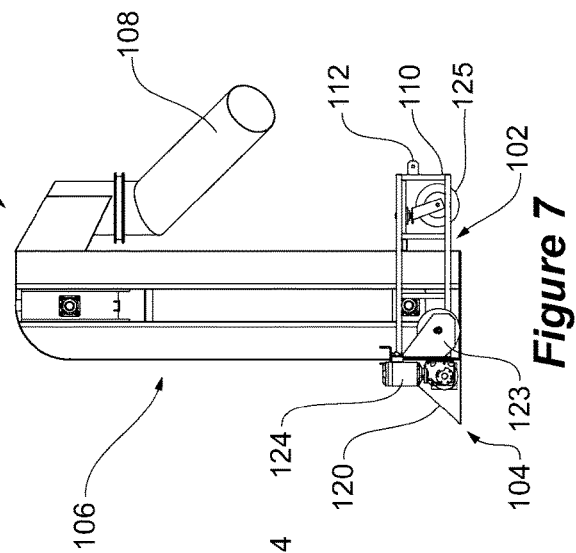

IMPROVEMENTS RELATING TO THE STACKING AND RECLAIMING OF BULK MATERIALS

REFERENCES TO RELATED APPLICATIONS

The present application claims priority from:

Australian Provisional Patent Application No. 2015902482 titled "IMPROVEMENTS RELATING TO THE STACKING AND RECLAIMING OF BULK MATERIALS" and filed on 26 Jun. 2015; and Australian Provisional Patent Application No. 2016900675 titled "IMPROVEMENTS RELATING TO THE STACKING AND RECLAIMING OF BULK MATERIALS" and filed on 25 Feb. 2016;

the content of each of which is hereby incorporated by reference in its entirety.

TECHNICAL FIELD

Embodiments of the present disclosure relate to equipment for handling bulk materials. In a particular form, the present disclosure relates to equipment for use in stockpiling grains in a bulk storage system of the type commonly referred to as a bunker, although its application is not so limited.

BACKGROUND

Bulk material can be of innumerable types and kinds, such as coal, slag, Taconite, Pyrite or iron ore pellets, clay, cinders, crushed marble, gravel, pencil pitch, salt, agricultural lime, carbon black, sand, sawdust, wood chips, wheat, canola, soy beans and other agricultural products, for example. A bunker for bulk materials typically comprises a wall encircling a region in which the bulk material is stockpiled.

A stacker is a large machine used in bulk material handling. Its function is to pile bulk material on to a stockpile. Recovering bulk material from a stockpile requires a second, separate machine known as a reclaimer, alternatively, this task may be performed using a front end loader. Typically, reclaimers are large machines which travel on rails between stockpiles, so they are not well suited to use in bunkers.

It is against this background and the problems and difficulties associated therewith that the present disclosure has been developed.

Certain objects and advantages of the present disclosure will become apparent from the following description, taken in connection with the accompanying drawings, wherein, by way of illustration and example, an embodiment of the present disclosure is disclosed.

SUMMARY

According to a first aspect, there is provided a mobile stacker and reclaimer combination comprising a mobile stacker (i.e. a mobile bulk material stacking apparatus), and an adapter (or reclaimer attachment) which is detachably securable with respect to the mobile stacker to convert the mobile stacker into a mobile reclaimer (i.e. a mobile bulk material reclaiming apparatus).

According to a further aspect, there is provided an adaptor (or reclaimer attachment) adapted for detachable securement with respect to a mobile stacker (i.e. a mobile bulk material stacking apparatus) to convert the mobile stacker into a mobile reclaimer.

According to a further aspect, there is provided a mobile stacker comprising a connection means via which an adapter is detachably securable with respect thereto, to convert the mobile stacker into a mobile reclaimer.

In one form, the mobile stacker comprises a base riding on a conveyance means, a conveyor boom and a hopper depending from the base, and wherein in use, the conveyor boom is fed the bulk material by the hopper, and discharges the bulk material to a stockpile.

In one form, the mobile stacker comprises a connection means via which the adapter is detachably securable with respect to the mobile stacker.

In one form, the mobile stacker comprises a plurality of connection means via which the adapter is detachably securable with respect to the mobile stacker in more than one position.

In one form, the adapter (or reclaimer attachment) is adapted to collect bulk material and supply this to the hopper of the stacker. In one form, the adapter collects bulk material at or near ground level.

In one form, the adapter (or reclaimer attachment) is adapted to simultaneously collect the bulk material and feed this to the mobile stacker.

In one form, the adapter is powered (or driven) by the stacker. In an alternative, the adapter is powered independently of the stacker, or self-powered.

In one form, the adapter comprises a base riding on a conveyance means, and a collector, an elevator and a discharge chute for bulk material, and wherein in use, the bulk material is collected in the collector and then conveyed to the discharge chute by the elevator.

In a further aspect, there is provided a reclaimer (i.e. a bulk material reclaiming apparatus) comprising a base riding on a conveyance means, and a collector, an elevator and a discharge chute for bulk material, and wherein in use, the bulk material is collected in the collector and then conveyed to the discharge chute by the elevator.

In one form, the adapter comprises a connection means via which the adapter is detachably securable with respect to the mobile stacker.

In one form, the adapter comprises a connection means via which the adapter is detachably securable with respect to the mobile stacker in more than one position.

In one form, the collector comprises at least one elongate trough suspended from the base, the or each trough comprising an outlet port.

In one form, the or each collector further comprises at least one powered conveyor driving bulk material collected in the trough.

In one form, the powered conveyor comprises an auger. In an alternative, the powered conveyor comprises a conveyor belt or chain driven drag conveyor.

In one form, the collector comprises a pair of the elongate troughs arranged end to end alongside of each other, each trough comprising a proximal end depending from the base and comprising the trough outlet port, and at least one powered conveyor driving bulk material collected in the trough from at or toward a distal end toward its trough outlet port.

In one form, the elevator for bulk material comprises a bucket elevator.

In one form, the conveyor boom comprises a boom, and a motor powered conveyor running through the boom and between a proximal end thereof, at which end the hopper will deposit bulk material onto the conveyor, and a distal end thereof, which comprises an outlet chute into which the conveyor will feed bulk material.

In one form, the conveyance means comprises a plurality of wheels.

In one form, the conveyance means comprises a plurality of crawler tracks.

According to a further aspect, there is provided a mobile reclaimer comprising a detachable adaptor, the removal of which converts the mobile reclaimer into a mobile stacker.

In one form, the mobile reclaimer comprises a base, a conveyor boom, and a collector assembly depending from the base, wherein in use, the collector assembly is adapted to collect the bulk material from at or near ground level and supply this to the conveyor boom.

In one form, the mobile stacker comprises a drive means for the conveyance means, which renders the stacker mobile.

According to a further aspect, there is provided a mobile stacker and reclaimer combination comprising a mobile stacker, and a mobile reclaimer which is movable independently to the mobile stacker, wherein in use, the mobile reclaimer simultaneously collects a bulk material and feeds this to the mobile stacker.

In one form, the mobile stacker comprises a base riding on a conveyance means, a conveyor boom and a hopper depending from the base, and wherein in use, the conveyor boom is fed a bulk material by the hopper, and discharges the bulk material to a stockpile.

In one form, the mobile reclaimer comprises a base riding on a conveyance means, and a collector, an elevator and a discharge outlet for bulk material, and wherein in use, the bulk material is collected in the collector and then conveyed to the discharge outlet by the elevator.

In one form, the discharge outlet comprises a conveyor.

In one form, the discharge outlet comprises a chute.

In one form, the conveyance means comprises a power plant and a power train.

According to a further aspect, there is provided a mobile reclaimer for use with a mobile stacker, wherein in use, the mobile reclaimer is movable independently to the mobile stacker, and simultaneously collects a bulk material and feeds this to the mobile stacker.

According to a further aspect, there is provided a mobile stacker and reclaimer combination comprising a mobile stacker, and a mobile reclaimer comprising a collector for a bulk material, and a power train so that the mobile reclaimer is movable independently to the mobile stacker, and wherein in use, the mobile reclaimer simultaneously collects the bulk material and feeds this to the mobile stacker.

According to a further aspect, there is provided a mobile reclaimer for use with a mobile stacker, the mobile reclaimer comprising a collector for a bulk material and a power train, so that the mobile reclaimer is movable independently to the mobile stacker, and wherein the mobile reclaimer is adapted to simultaneously collect the bulk material and feed this to the mobile stacker.

According to a further aspect, there is provided a mobile stacker and reclaimer combination comprising a mobile stacker, and a mobile reclaimer comprising a base riding on a conveyance means, a tower which extends up from the base, at least one elongate collector for a bulk material suspended from the base at or near ground level so as to be extending transversely, the or each collector comprising an outlet and at least one powered conveyor driving bulk material collected in the collector toward the outlet, an elevator conveying the bulk material from the or each collector up the tower to a slewing conveyor boom mounted atop the tower, and a power train so that the mobile reclaimer is movable independently to the mobile stacker, and wherein in use, the mobile reclaimer simultaneously collects the bulk material and feeds this to the mobile stacker.

According to a further aspect, there is provided a mobile stacker, the mobile reclaimer comprising a base riding on a conveyance means, a tower which extends up from the base, at least one elongate collector for a bulk material suspended from the base at or near ground level so as to be extending transversely, the or each collector comprising an outlet and at least one powered conveyor driving bulk material collected in the collector toward the outlet, an elevator conveying the bulk material from the or each collector up the tower to a slewing conveyor boom mounted atop the tower, and a power train, so that the mobile reclaimer is movable independently to the mobile stacker, and wherein the mobile reclaimer is adapted to simultaneously collect the bulk material and feed this to the mobile stacker.

According to a further aspect, there is provided a mobile stacker and reclaimer combination comprising a mobile stacker, and an adapter which is detachably securable with respect to the mobile stacker to convert the mobile stacker into a mobile reclaimer, the adapter comprising a base, a tower which extends up from the base, a collector for a bulk material suspended from the base at or near ground level so as to be extending transversely, the or each collector comprising an outlet and at least one powered conveyor driving bulk material collected in the collector toward the outlet, an elevator conveying the bulk material from the or each collector up the tower to a discharge chute atop of the tower, and wherein in use, the adapter simultaneously collects the bulk material and feeds this to the mobile stacker.

A detailed description of one or more embodiments of the disclosure is provided below along with accompanying figures that illustrate by way of example the principles of the disclosure. While the disclosure is described in connection with such embodiments, it should be understood that the disclosure is not limited to any embodiment. On the contrary, the scope of the disclosure is limited only by the appended claims and the disclosure encompasses numerous alternatives, modifications and equivalents. For the purpose of example, numerous specific details are set forth in the following description in order to provide a thorough understanding of the present disclosure.

The present disclosure may be practiced according to the claims without some or all of these specific details. For the purpose of clarity, technical material that is known in the technical fields related to the disclosure has not been described in detail so that the present disclosure is not unnecessarily obscured.

DESCRIPTION OF DRAWINGS

Embodiments of the present disclosure will be discussed with reference to the accompanying drawings wherein:

FIG. 4 is a front view of the apparatus of FIG. 1;

FIG. 5 is a front view of an adapter from the apparatus of FIG. 1;

FIG. 6 is a plan view of the adapter of FIG. 5;

FIG. 7 is a side view of the adapter of FIG. 5;

In the following description, like reference characters designate like or corresponding parts throughout the figures.

DETAILED DESCRIPTION

Figure 1:
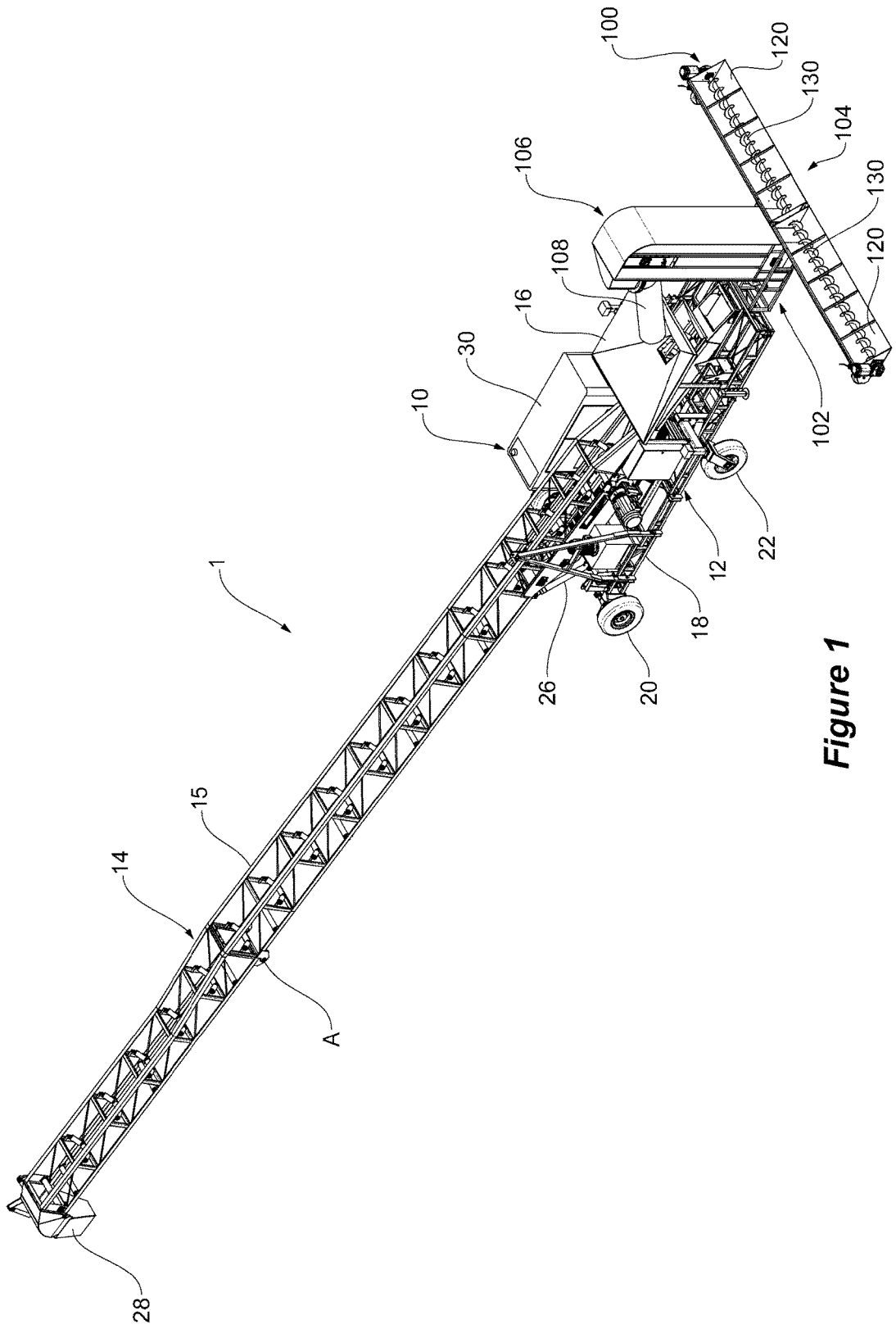
FIG. 1 is a perspective view of a combined mobile stacker and reclaimer apparatus for a bulk material.
Figure 2:
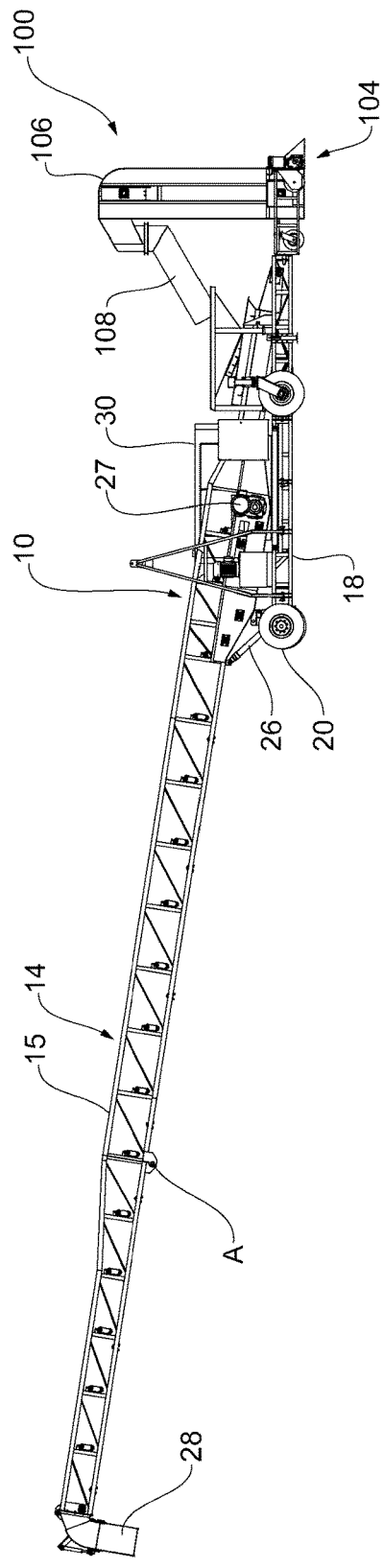
FIG. 2 is a side view of the apparatus of FIG. 1.

Referring now to FIGS. 1 through 4, there is shown a mobile stacker and reclaimer combination 1 for a bulk material, according to an embodiment. For the purpose of further explanation, reference will be made to use of the apparatus for the handling of grains, although its application is not so necessarily restricted.

The mobile stacker and reclaimer combination 1 comprises a mobile stacker 10, and an adapter (or reclaimer attachment) 100 which is detachably securable with respect to the mobile stacker 10 to convert the mobile stacker 10 into a mobile reclaimer. It will be apparent to those skilled in the art, that the adapter (or reclaimer attachment) 100 can be used with different stackers to the one illustrated, including stationary stackers, or on its own, without a stacker.

The mobile stacker 10 comprises a base 12 riding on a conveyance means, a conveyor boom 14 and a hopper 16 via which the conveyor boom 14 is fed, where both the conveyor boom 14 and the hopper 16 depend from the base 12. The mobile stacker further comprises a power train, which comprises an engine-generator (or Genset) for driving it, and propelling it, although this power train may take other well-known forms.

The base 12 comprises a chassis 18, and the conveyance means comprises a set of four wheels on which the apparatus 1 rolls. In a non-illustrated alternate embodiment, the wheels may be replaced by crawler (or continuous) tracks.

The set of four wheels is comprised of two distinct pairs of wheels. A first, driven and steerable pair of wheels 20 is located at or toward a first end of the chassis, and a second pair of non-driven wheels 22 at or toward a second end thereof. These driven and steerable wheels 20 are operable by an operator via controls located at a control box 30, which sits on the chassis 18.

The second pair of wheels comprise heavy duty castor wheels 22 mounted to outrigger arms 24 to aid maneuverability of the stacker 10.

The conveyor boom 14 comprises a boom 15 of a space frame construction, and a motor 27 powered conveyor running through the boom 15 and between a proximal end (i.e. the boom end at the base 18) thereof, at which end the hopper 16 will deposit bulk material onto the conveyor, and a distal end thereof, which comprises an outlet chute 28 into which the conveyor will feed bulk material for out letting from the stacker 10.

The boom 15 is comprised of two parts which are pivotally attached at point A so that the boom 15 can be folded to simplify transport (such as by low loader) of the combined mobile stacker and reclaimer 1, or stacker 10 only (i.e. in cases where the adapter 100 is removed from the stacker 10).

The conveyor boom 14 is pivotally mounted with respect to the chassis 18 so that the angle of the conveyor boom 14 may be changed via an actuator (a hydraulic ram) 26 to raise or lower a height of the outlet chute 28 as required.

The adapter 100 comprises a base 102, a conveyance means, a collector 104, an elevator tower 106 and a discharge chute 108.

The base 102 comprises a chassis 1 10, and the conveyance means for the adapter 100 comprises a set of wheels, where this set is comprised of two distinct pairs of wheels, on which the adapter 100 rolls. A first pair of wheels comprises a collector support wheel 123 at each end of the collector 104. A second pair of wheels comprises a pair of chassis support wheels 125, these being heavy duty castor wheels, to aid manoeuvrability of the adapter 100.

The adapter chassis 1 10 comprises connection mounts 1 12, via which it can be detachably secured to cooperating connection mounts depending from the stacker chassis 18, such as by using bolts, or pins, which in turn may be spring loaded and/or driven by actuators to engage in receiving apertures.

The collector 104 comprises a pair of elongate troughs 120, which are suspended from the base 102 near ground level, and which are arranged end to end alongside of each other. Each trough 120 comprises a proximal end depending from the base 102 and comprising a trough outlet port 122, and a distal end which is supported on a collector support wheel 123, and at which a motor 124 is supported. Each trough 120 further comprises a floor, a back wall comprising the trough outlet port 122, and a pair of end walls.

Each motor 124 drives an auger 130 which is supported at its ends by bearings in the end walls of the trough 120. In use, each auger 130 drives bulk material collected in its respective trough 120 toward its respective trough outlet port 122, wherefrom it is passed to the elevator tower 106.

The elevator tower 106 comprises a tower frame and cover panels, and a motor powered bucket elevator (visibility of which is obscured by the tower cover panels) running up through the tower from the trough outlet ports 122, wherefrom the bucket elevator will receive bulk material, to the discharge chute 108 into which the bucket elevator will feed bulk material.

Figure 3:
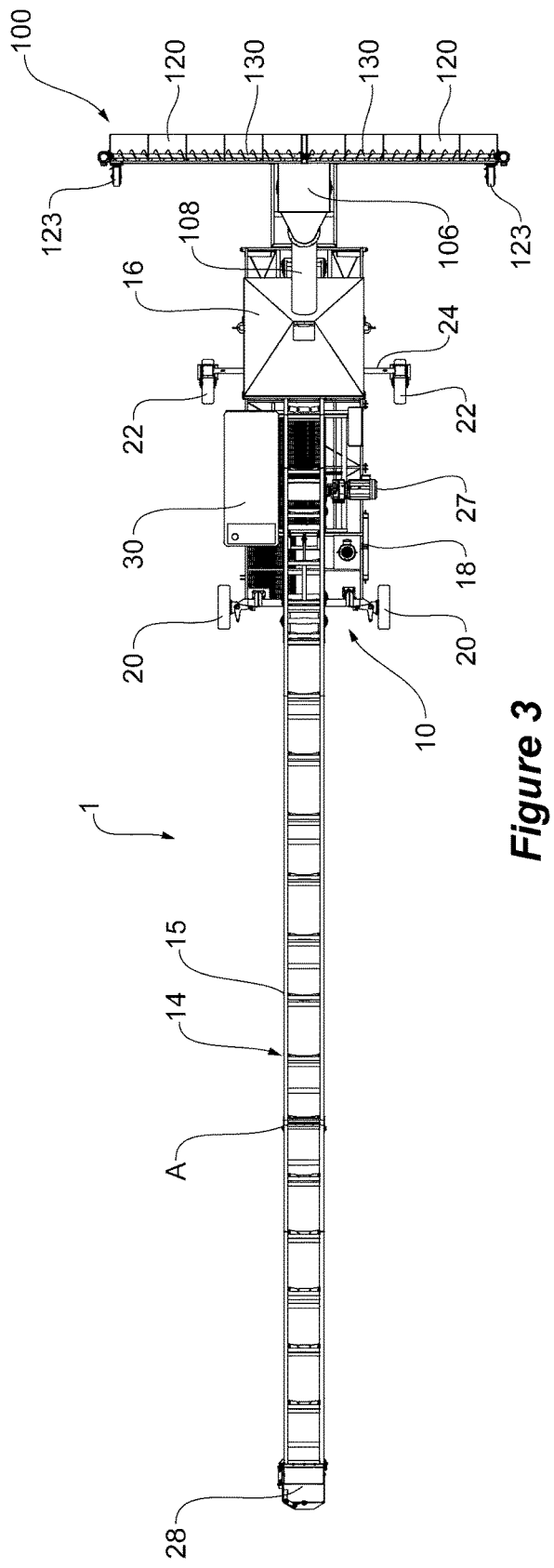
FIG. 3 is a plan view of the apparatus of FIG. 1.

In use, when a reclaiming operation is required, the adapter 100 will be secured to the stacker 10, and the discharge chute 108 from the adapter 100 will be positioned so as to be discharging into the hopper 16 of the stacker 10. The combined mobile stacker and reclaimer 1 as illustrated in FIG. 3, can then be driven about in the bunker and stockpile collector 104 first (by an operator at control box 30), scooping up bulk material (a grain in this case) in the troughs 120 of the collector 104, wherefrom this bulk material is passed to the trough elevator in the elevator tower 106, through the discharge chute 108, into the hopper 16, onto the conveyor of the conveyor boom 14, out of the outlet chute 28 and into a tip body of a trailing tip truck, trailer, wagon, or another mechanical device, such as a conveyor.

Figure 8:
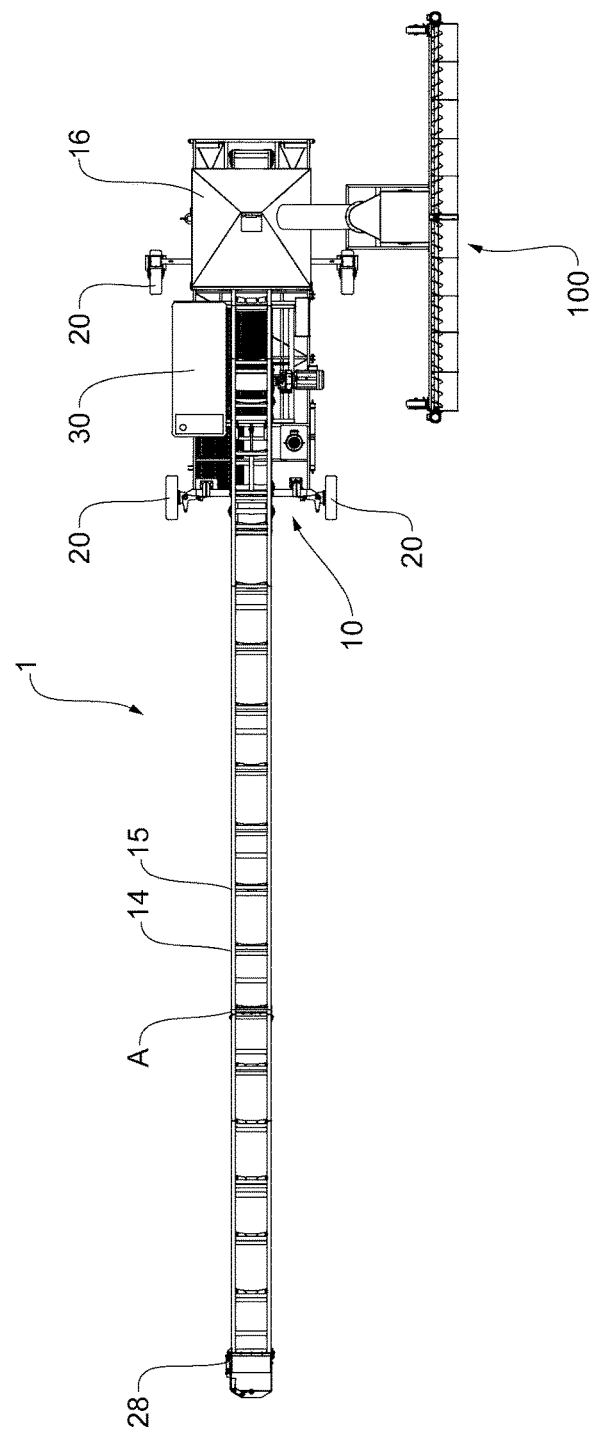
FIG. 8 is a plan view of the apparatus of FIG. 1 in a further configuration.

With reference to FIG. 8, it can be seen how the adapter 100 can be secured to the stacker 10 in an alternate, side mounted position (it can be secured to either side of the stacker 10), 90° from the end mounted position illustrated in FIGS. 1 through 4. The wheels 20 can be swung inwardly (i.e. so that they are aligned) so that the stacker 10 can be driven in a sideways direction collector 104 first.

In use, when a stacking operation is required, the stacker 10 is driven into a position outside of, but alongside of, the bunker so that the outlet chute 28 is suspended above the bunker. The adapter 100 can be removed from the stacker 10, or, alternatively, the discharge chute 108 from the adapter 100 can be moved (such as by pivoting) out of the way of the hopper 16 so that bulk material can be fed to the hopper 16 in the conventional fashion, wherefrom it is fed onto the conveyor of the conveyor boom 14, out of the outlet chute 28 and into the bunker, where it is stockpiled. Again, the wheels 20 can be swung inwardly (i.e. so that they are aligned) so that the stacker 10 can be driven in a sideways direction around a perimeter of the bunker.

In further, alternate, non-illustrated embodiments, the combined mobile stacker and reclaimer 1 might be any one of remotely controlled (i.e. wirelessly controlled by an operator located a short distance from the machine), or substantially autonomous (by way of comprising sensors, cameras and a control system etc.).

In yet a further, alternate, non-illustrated embodiment, the combined mobile stacker and reclaimer 1 might be cable guided. That is to say, it comprises a steering system comprising a follower mechanism which is adapted to follow a suspended cable.

In an alternative mode of use, the adapter 100 may be used with a stacker which must be towed to make it move, by means such as (but not limited to) a winch.

In a further alternative mode of use, the adapter 100 may be used on its own, as a reclaimer, by making it self-driven, or by towing it by means such as (but not limited to) a winch, and following it with a truck and/or trailer which receives the bulk material.

Figure 9:
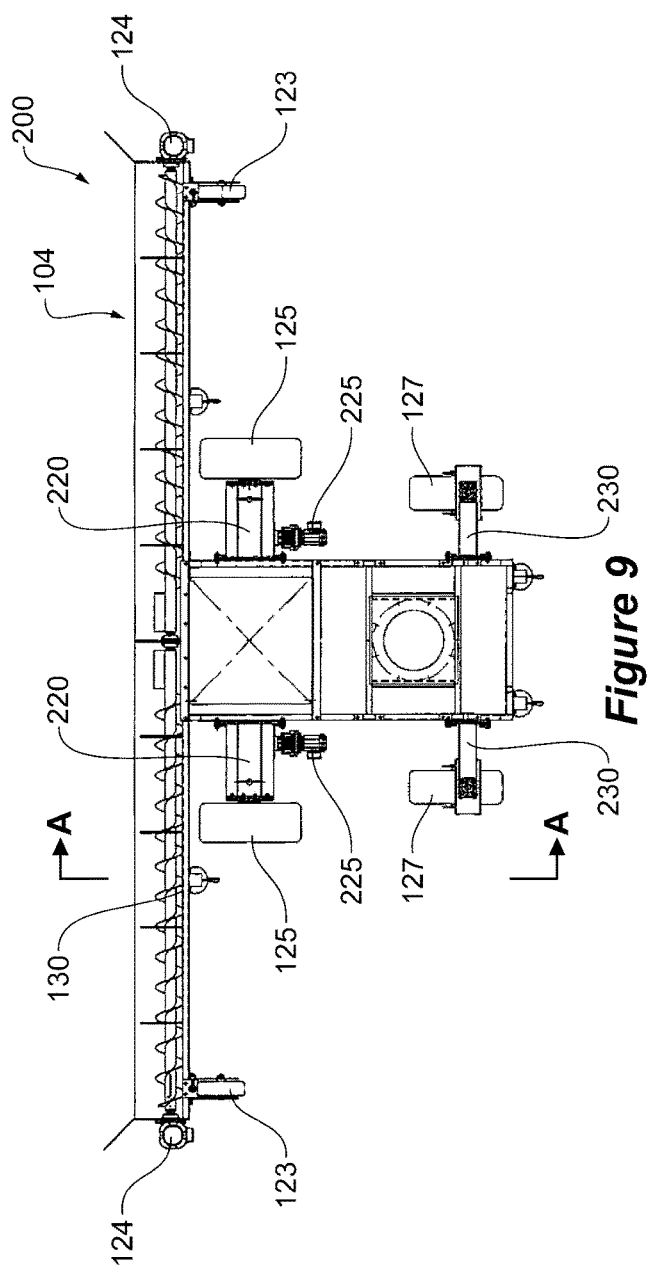
FIG. 9 is a plan view of a mobile reclaimer.
Figure 11:
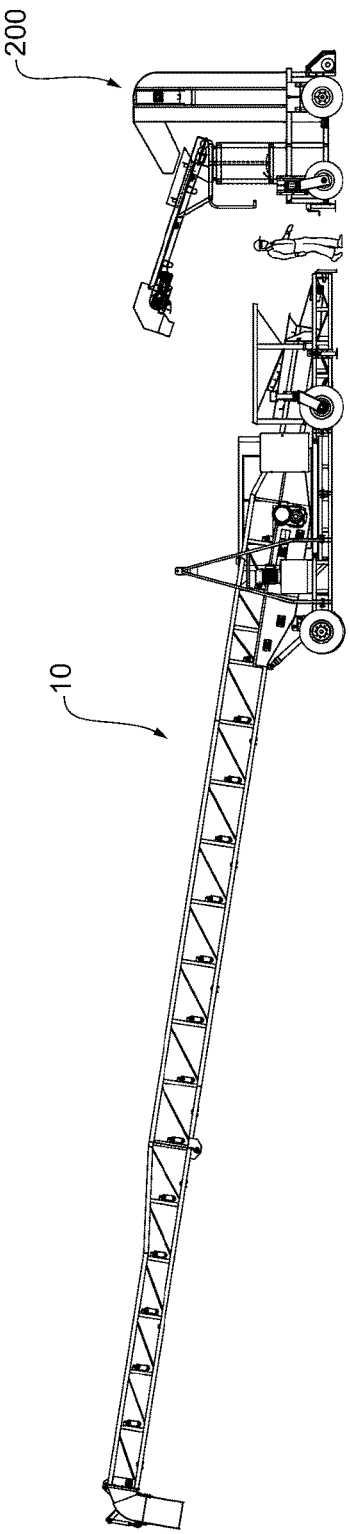
FIG. 11 is a side view of the mobile reclaimer of FIG. 9 feeding the stacker of FIG. 1.
Figure 10:
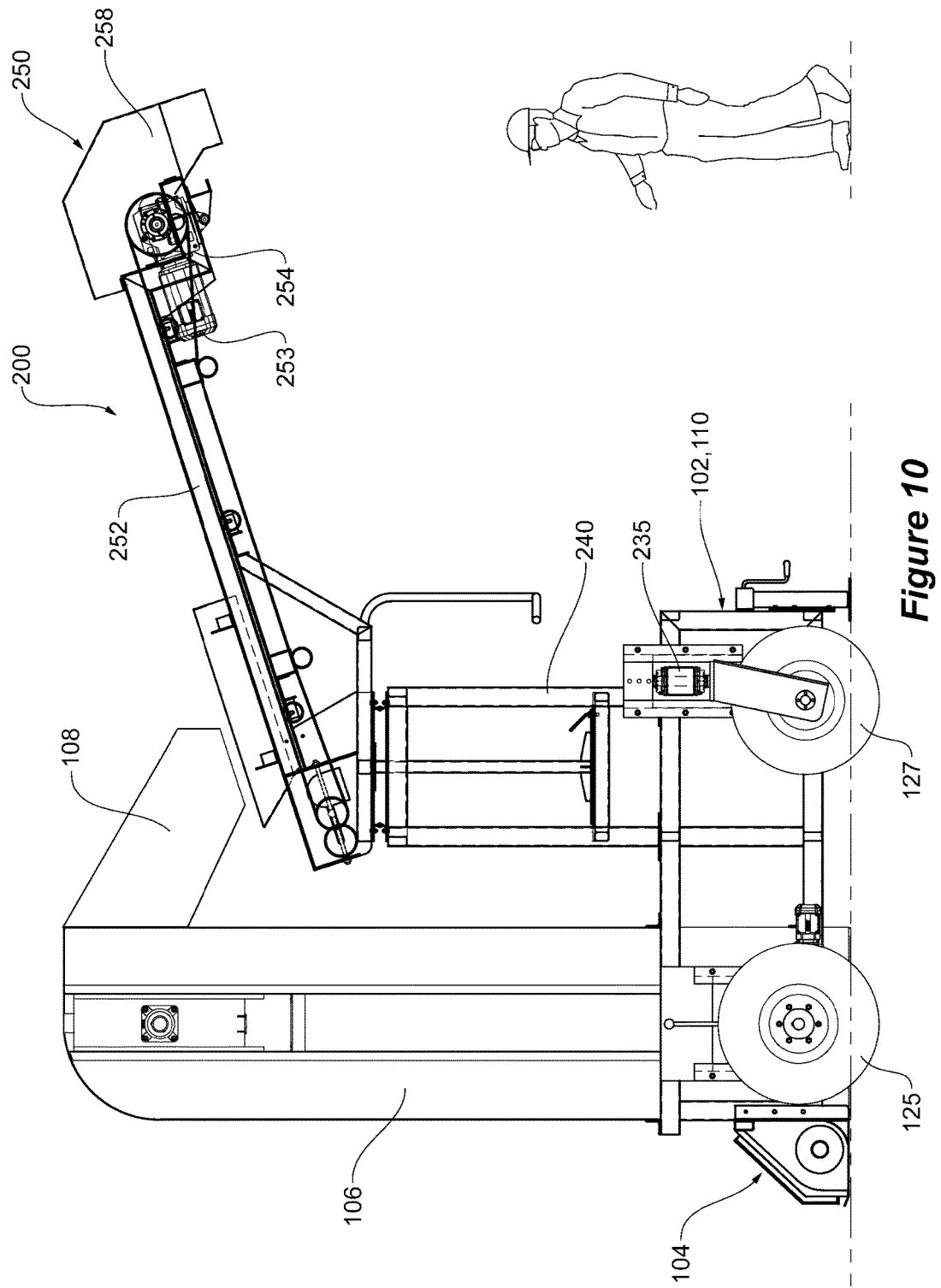
FIG. 10 is a cross-sectional view of the mobile reclaimer of FIG. 9, taken along line A-A.

Referring now to FIGS. 9 and 10, where there is illustrated a mobile reclaimer 200, which shares a high degree of similarity with the adapter 100 described above, but which differs in some key respects, which enables it to be movable independently of the mobile stacker 1. Those parts of the mobile reclaimer 200 which are identical (or near-identical) to corresponding parts shown of the adapter 100 of FIGS. 1 through 8, will be denoted by the same reference numerals and will not be described again in detail.

Mobile reclaimer 200 comprises a base 102, a power train (which comprises conveyance means), a collector 104, an elevator tower 106 and a chute 108. Mobile reclaimer 200 comprises its own power train so that it is not dependent on the mobile stacker 10 for power and movement.

The base 102 comprises a chassis 110, and the conveyance means for the mobile reclaimer 200 comprises a set of wheels, where this set is comprised of three distinct pairs of wheels, on which the mobile reclaimer 200 rolls. A first pair of wheels comprises a collector support wheel 123 at each end of the collector 104. The second pair of wheels comprises a pair of drive wheels 125, and the third pair comprises a pair of steer wheels 127.

The drive wheels 125 are located toward a forward end of the chassis 110, and the steer wheels 127 are located toward a rear end of the chassis 110.

Each of the drive wheels 125 is located at a distal end of a fore outrigger strut 220, and is driven by a drive motor 225.

Each of the steer wheels 127 comprises a castor wheel located at a distal end of an aft outrigger strut 230. Each of the steer wheels 127 is turned by a steering motor 235.

Locating the drive wheels 125 and steer wheels 127 distally on respective outriggers 220 and 230, improves the stability of the mobile reclaimer 200.

Mobile reclaimer 200 further comprises a conveyor boom 250 slewably (i.e. rotatably) mounted atop of a tower 240, which extends up from the chassis 110. The conveyor boom 250 comprises a boom 252, and a motor 253 powered conveyor 254 running along the boom 252 and between a proximal end (i.e. at the tower 240) thereof, at which end a hopper 256 will receive deposit bulk material from the chute 108, and deposit this onto the conveyor 254, and a distal end thereof, which comprises an outlet chute 258 into which the conveyor 254 will feed bulk material for outletting from the mobile reclaimer 200 to the stacker 10.

In use, when a reclaiming operation is required, the mobile reclaimer 200 will be positioned adjacent to the stacker 10, with the outlet chute 258 from the boom conveyor 250 positioned so as to be discharging into the hopper 16 of the stacker 10 (or directly into a tipper truck or trailer). The mobile reclaimer 200 can then be driven about in the bunker and stockpile (by an operator at control box 30, or using a remote control) independently of the stacker 10 (which remains stationary), collector 104 first, scooping up bulk material (a grain in this case) in the troughs 120 of the collector 104, wherefrom this bulk material is passed to the trough elevator in the elevator tower 106, through the discharge chute 108, into the hopper 256, along conveyor 254, through outlet chute 258 into the hopper 16, onto the conveyor of the conveyor boom 14, out of the outlet chute 28 and into a tip body of a trailing tip truck, trailer, wagon, or another mechanical device, such as a conveyor. The relative verticality of the independently movable mobile reclaimer 200 gives it a small footprint and renders it highly manoeuvrable.

As the mobile reclaimer 200 moves, the boom conveyor 250 can be slewed to ensure that this continues to discharge into hopper 16. Slewing may be driven, or manually effected.

When the mobile reclaimer 200 must be moved so far from the mobile stacker 1 as to be beyond the reach of the conveyor boom 250, the mobile stacker 1 must be repositioned so as to once again be within the reach of the conveyor boom 250. This is made easier where the mobile stacker 1 comprises its own drivetrain.

The mobile reclaimer 200 could be remote controlled, or controlled by an operator at a control panel on the mobile reclaimer 200.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the disclosure as set forth and defined by the following claims.

The invention claimed is:

1. A mobile stacker and reclaimer combination, comprising a mobile stacker, and a mobile reclaimer comprising a base riding on a conveyance means, a tower which extends up from the base, at least one elongate collector for a bulk material suspended from the base at or near ground level so as to be extending transversely, the at least one collector comprising an outlet and at least one powered conveyor driving bulk material collected in the at least one collector toward the outlet, an elevator conveying the bulk material from the at least one collector up the tower to a slewing conveyor boom mounted atop the tower, and a power train so that the mobile reclaimer is movable independently to the mobile stacker, wherein, in use, the mobile reclaimer simultaneously collects the bulk material and feeds the bulk material to the mobile stacker.

2. The mobile stacker and reclaimer combination of claim 1, wherein the collector comprises a first elongate trough suspended from a base.

3. The mobile stacker and reclaimer combination of claim 2, wherein the trough further comprises a powered auger for driving bulk material collected in the trough toward the outlet.

4. The mobile stacker and reclaimer combination of claim 2, wherein the collector further comprises a second elongate trough having an outlet port, the first and second troughs arranged end to end alongside of each other, each of the first and second troughs comprising a proximal end depending from the base and having the outlet port, and a powered auger configured to drive bulk material collected in the trough toward the outlet port.

5. The mobile stacker and reclaimer combination of claim 1, wherein the elevator is a bucket elevator.

6. The mobile stacker and reclaimer combination of claim 1, wherein the mobile stacker comprises a base riding on a conveyance means, a conveyor boom, and a hopper depending from the base, wherein, in use, the conveyor boom is fed the bulk material via the hopper and discharges the bulk material to a stockpile.

7. The mobile stacker and reclaimer combination of claim 1, wherein the mobile stacker comprises a connection means via which the mobile reclaimer is detachably securable with respect to the mobile stacker.

8. The mobile stacker and reclaimer combination of claim 1, wherein the mobile reclaimer comprises a connection means via which the mobile reclaimer is detachably securable with respect to the mobile stacker.

9. The mobile stacker and reclaimer combination of claim 1, wherein the conveyance means comprises a plurality of wheels.

10. The mobile stacker and reclaimer combination of claim 1, wherein the conveyance means comprises a plurality of crawler tracks.

11. A mobile reclaimer comprising a base riding on a conveyance means, a tower which extends up from the base, at least one elongate collector for a bulk material suspended from the base at or near ground level so as to be extending transversely, the at least one collector comprising an outlet and at least one powered conveyor driving bulk material collected in the collector toward the outlet, an elevator conveying the bulk material from the at least one collector up the tower to a slewing conveyor boom mounted atop the tower, and a power train, so that the mobile reclaimer is movable independently to a mobile stacker, wherein the mobile reclaimer is adapted to simultaneously collect the bulk material and feed the bulk material to the mobile stacker.

12. The mobile reclaimer of claim 11, wherein the collector comprises a first elongate trough suspended from the base, the first trough having an outlet port.

13. The mobile reclaimer of claim 11, wherein the at least one powered conveyor comprises a powered auger for driving bulk material toward the collector outlet.

14. The mobile reclaimer of claim 11, wherein the at least one collector further comprises a second elongate trough having an outlet port, the first and second troughs arranged end to end alongside of each other, each of the first and second troughs comprising a proximal end depending from the base and having an outlet port, the at least one powered conveyor comprises a powered auger configured to drive bulk material collected in the first or second trough toward the respective outlet port.

15. The mobile reclaimer of claim 11, wherein the elevator for bulk material is a bucket elevator.

16. The mobile reclaimer of claim 11, wherein the at least one powered conveyor comprises at least one powered drag conveyor driving bulk material toward the collector outlet.

17. The mobile reclaimer of claim 11, wherein the at least one collector comprises a pair of the elongate troughs arranged end to end alongside of each other, each trough comprising a proximal end depending from the base and comprising the trough outlet port, and comprises a powered drag conveyor driving bulk material collected in the trough from at or toward a distal end toward its trough outlet port.

18. The mobile reclaimer of claim 11, wherein the conveyance means comprises a plurality of wheels or a plurality of crawler tracks.

19. The mobile reclaimer of claim 11, wherein the tower extends vertically up from the base and substantially orthogonal to the at least one collector.

20. A mobile stacker and reclaimer combination, comprising a mobile stacker and an adapter which is detachably securable with respect to the mobile stacker to convert the mobile stacker into a mobile reclaimer, the adapter comprising a base, a tower which extends up from the base, a collector for a bulk material suspended from the base at or near ground level so as to be extending transversely, the collector comprising an outlet and at least one powered conveyor driving bulk material collected in the collector toward the outlet, an elevator conveying the bulk material from the collector up the tower to a discharge chute atop of the tower, and wherein in use, the adapter simultaneously collects the bulk material and feeds the bulk material to the mobile stacker.

21. An adaptor adapted for detachable securement with respect to a mobile stacker to convert the mobile stacker into a mobile reclaimer, the adapter comprising a base, a tower which extends up from the base, a collector for a bulk material suspended from the base at or near ground level so as to be extending transversely, the collector comprising an outlet and at least one powered conveyor driving bulk material collected in the collector toward the outlet, an elevator conveying the bulk material from the collector up the tower to a discharge chute atop of the tower, and wherein in use, the adapter simultaneously collects the bulk material and feeds the bulk material to the mobile stacker.

22. A mobile stacker comprising a connection means via which the adapter of claim 21 is detachably securable with respect thereto, to convert the mobile stacker into a mobile reclaimer.

* * * * *